Feb. 20, 1940.   S. GOODMAN   2,190,943

STICK HANDLING APPARATUS

Filed June 21, 1939   6 Sheets-Sheet 1

Inventor.
Samuel Goodman
By Maurice S. Cayne
Atty.

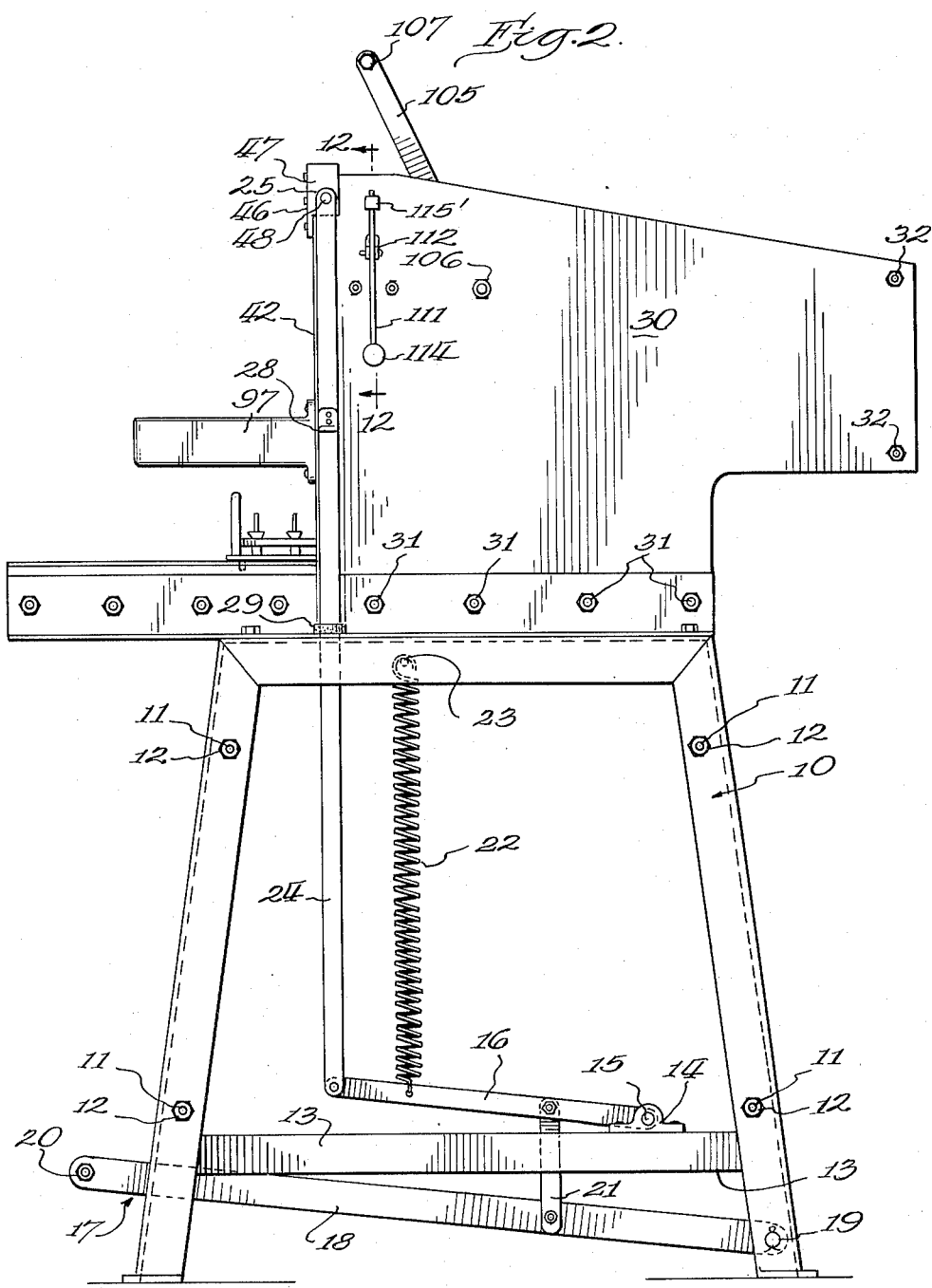

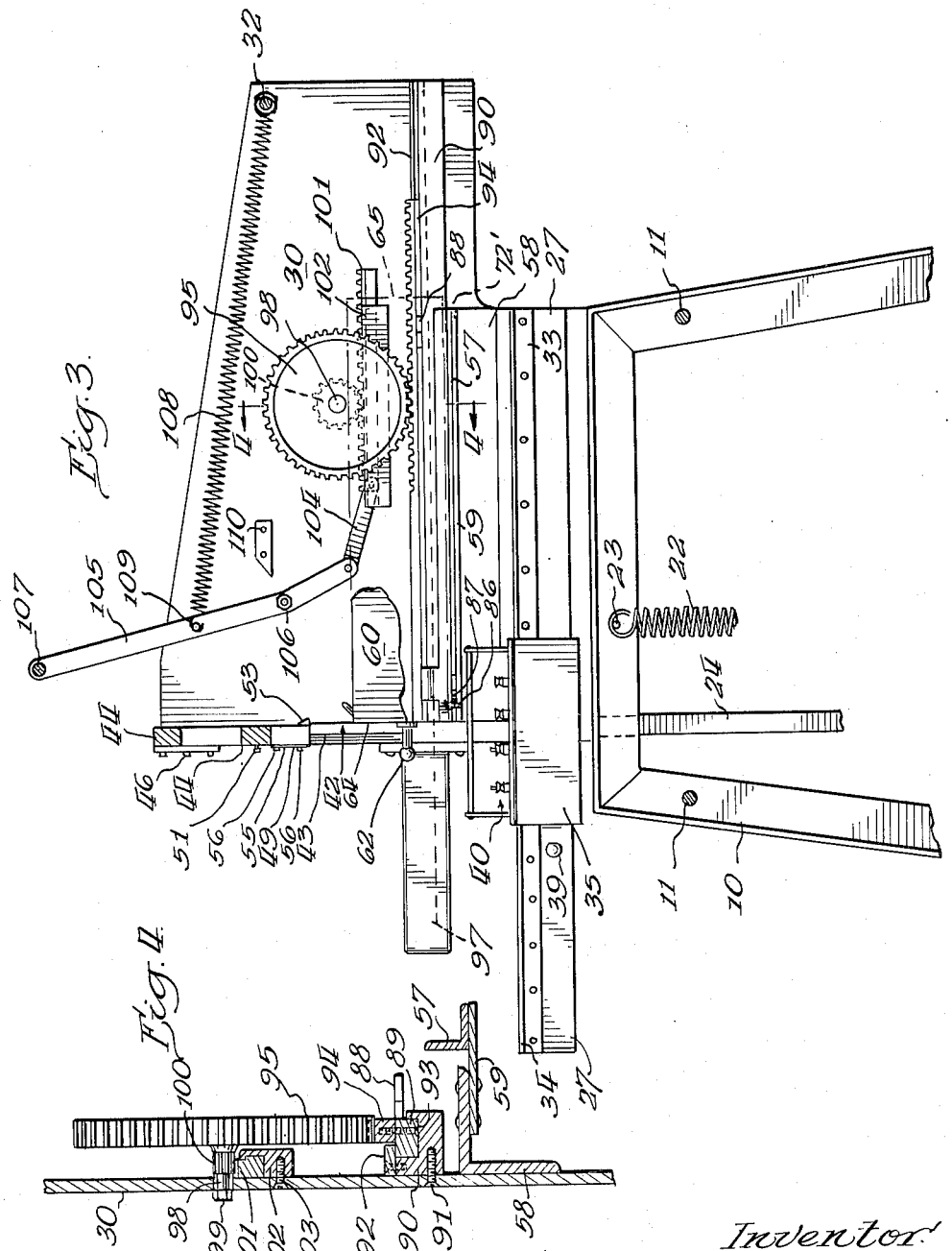

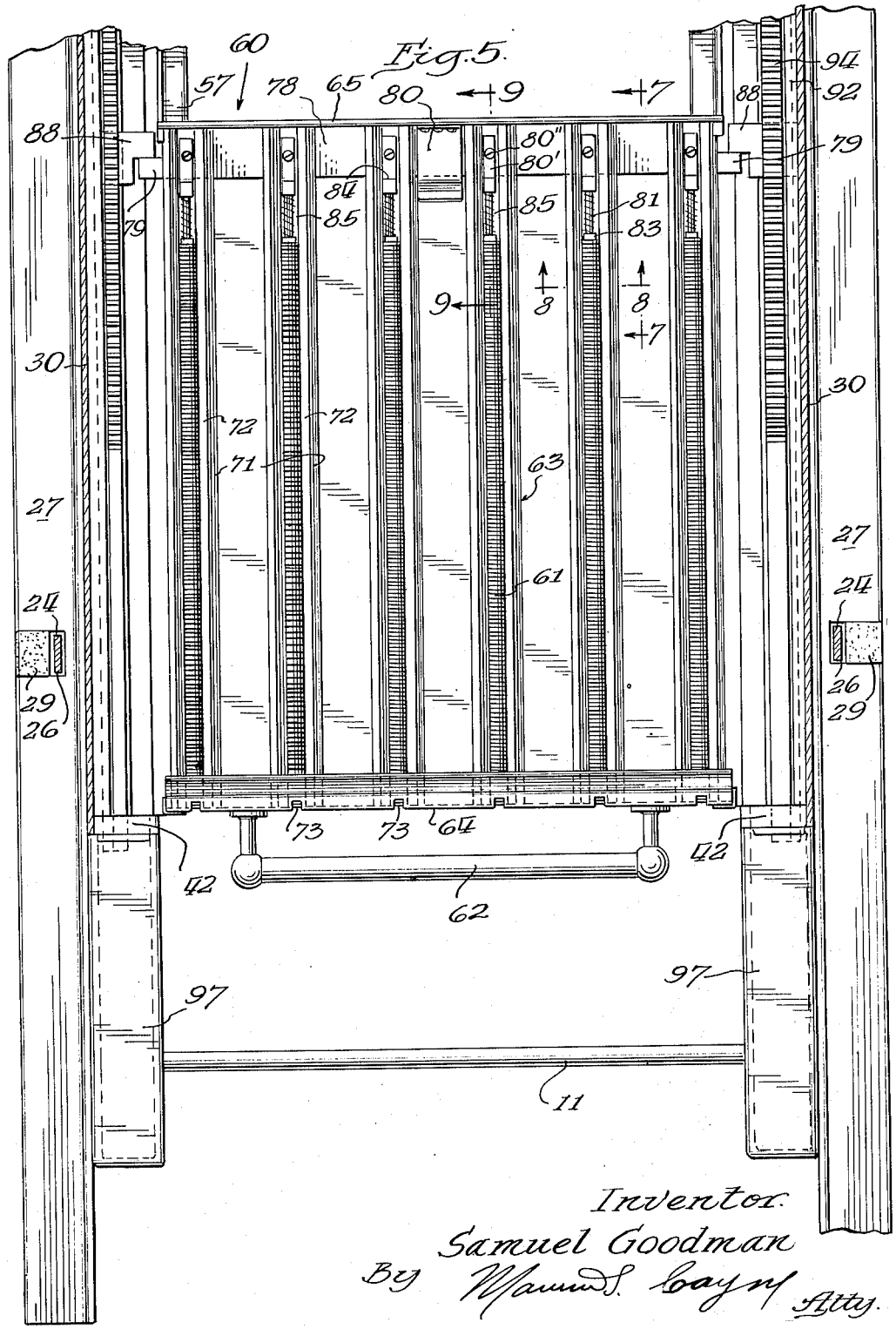

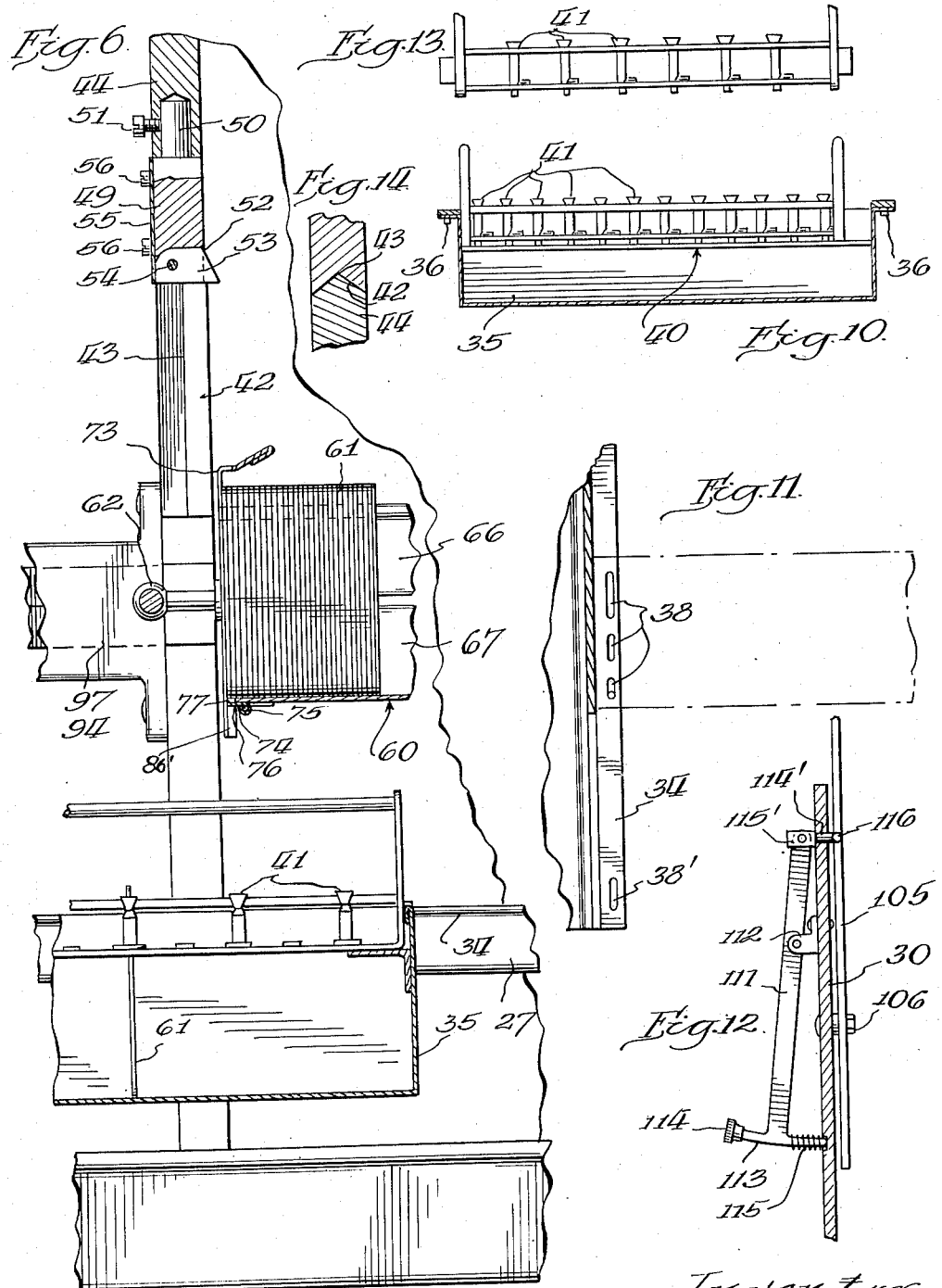

Feb. 20, 1940.   S. GOODMAN   2,190,943
STICK HANDLING APPARATUS
Filed June 21, 1939   6 Sheets-Sheet 6
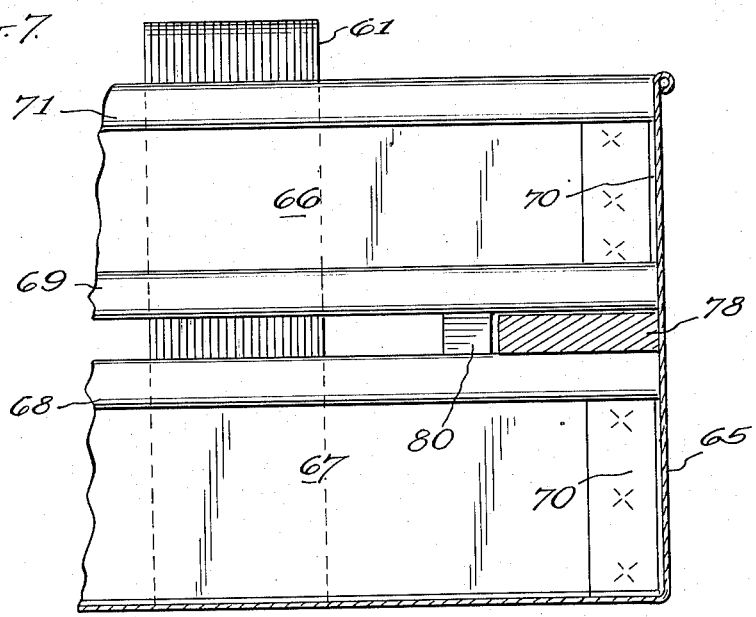
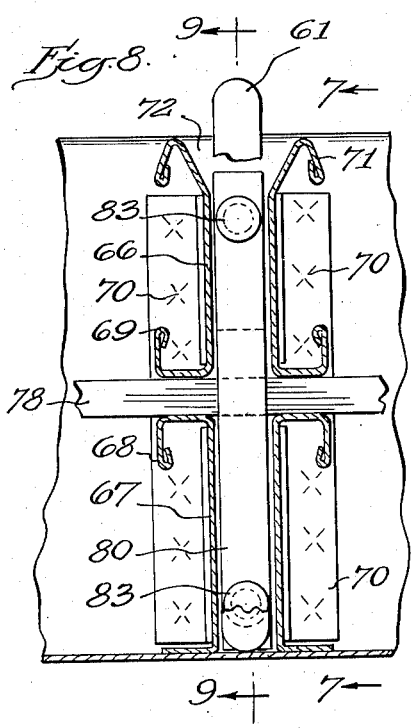
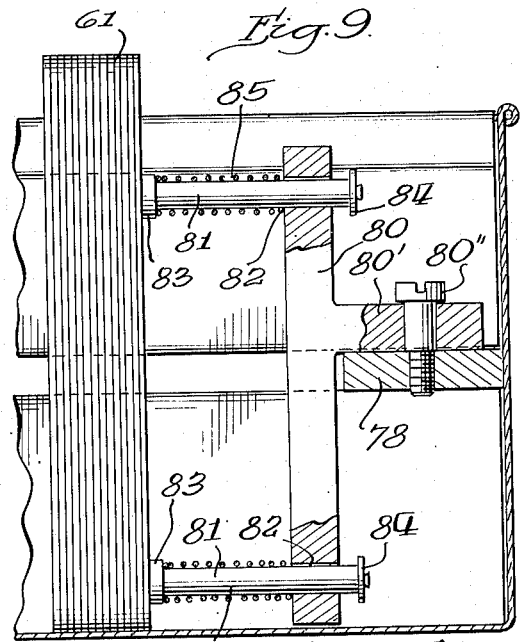
Inventor
Samuel Goodman
By [signature]
Atty.

Patented Feb. 20, 1940

2,190,943

UNITED STATES PATENT OFFICE 2,190,943

STICK HANDLING APPARATUS

Samuel Goodman, Chicago, Ill.

Application June 21, 1939, Serial No. 280,246

24 Claims. (Cl. 107—7)

The present invention relates generally to a device for the handling, storing and dispensing of articles. More specifically, the present invention purports to provide a semi-automatic mechanical device which will have a plurality of magazines adapted to hold large numbers of splints or wooden sticks adapted to be used as the handles of frozen confections and the like, and further to be adapted to dispense a plurality of said sticks, namely, one from each magazine simultaneously, projecting said dispensed sticks into a portable stick holding and carrying device. Said last referred to stick holding and carrying device is common to the trade and forms no part of the present invention beyond providing a means into which the sticks are dispensed.

The sticks are dispensed as aforesaid, into the portable stick holding and carrying device in rows of spacedly disposed association and are gripped therein. The carrier is then placed over multi-cavity molds or the like so that the confection may be frozen upon the said sticks.

It is the primary object of the present invention to provide a device of the character described, which will consist of simple and effective means for the simultaneous dispensing of a plurality of confection sticks into a stick holder.

It is a further object of the present invention to provide a device of the character described, which will include a removable drawer-like member provided with a plurality of magazines adapted to hold or store a large number of sticks, said magazines of each of said members being fillable with sticks when said drawer-like member is removed from the device, thus enabling a large number of said members to be filled with said sticks while said device is operating to dispense sticks from and empty one of said drawer-like members which is disposed in said device.

A further object of the present invention is to provide a device of the character described, which will have a drawer-like member provided with a plurality of stick magazines, said drawer-like member being adapted for instant removal from and replacement into said device.

A further object of the present invention is to provide a device of the character described which will be provided with a drawer-like member having a plurality of stick holding and dispensing magazines, said drawer being provided with novel means for the maintenance of the sticks within said magazines, and further being provided with novel means for the dispensing of said sticks from said magazines.

Still a further object of the present invention is to provide a device of the character described which will be provided with a plurality of stick holding magazines, means being provided to tension said sticks within said magazines.

Still a further object of the present invention is to provide a device of the character described, which will be provided with novel means for operating a stick tensioning device to cause the sticks within a plurality of dispensing magazines to be operated upon by said stick tensioning device.

Still a further object of the present invention is to provide a device of the character described, which will be provided with novel means for tensioning rows of sticks within dispensing and handling magazines, said tensioning means being operated by novel actuation means, and said actuation means being provided with a novel locking mechanism for locking said tensioning means in a position where said sticks are not under tension.

Still a further object of the present invention is to provide a device of the character described, which will include a plurality of magazines adapted to contain a plurality of rows of sticks, novel means for dispensing said sticks from said magazines, and novel actuating means for the operating of said last-mentioned means.

Still a further object of the present invention is to provide a treadle-operated stick handling and dispensing device which will be simple of construction and efficient in operation and further be adapted for economical fabrication in manufacture.

With the foregoing and other objects in view, which will appear as the description proceeds, the invention consists in certain novel features of construction, arrangement and combination of parts hereinafter fully described, illustrated in the accompanying drawings, and particularly pointed out in the appended claims, it being understood that various changes in the form, proportion, size and minor details of the structure may be made without departing from the spirit or sacrificing any of the advantages of the invention.

For the purpose of facilitating an understanding of my invention, I have illustrated in the accompanying drawings, a preferred embodiment thereof, from an inspection of which, when considered in connection with the following description, my invention, its mode of construction, assembly and operation, and many of its advantages should be readily understood and appreciated.

Referring to the drawings in which the same characters of reference are employed to indicate corresponding or similar parts throughout the several figures of the drawings:

Fig. 2 is a side elevational view of the same;

Fig. 3 is a view taken substantially along the line 3—3 of Fig. 1 and in the direction of the arrows, showing portions of the device in section;

Fig. 4 is a sectional detailed view of the tensioning mechanism, taken on line 4—4 of Fig. 3;

Fig. 5 is a plan view of a portion of the invention, taken generally along the line 5—5 of Fig. 1 in the direction of the arrows, with portions of the device shown in section;

Fig. 6 is a fragmentary sectional view taken generally along the line 6—6 of Fig. 1 and in the direction of the arrows;

Fig. 7 is a detailed view, showing a portion of one of the magazines for holding the sticks, taken generally along the line 7—7 of Fig. 5 or Fig. 8.

Fig. 8 is a fragmentary sectional view of one of the stick magazines taken generally along the line 8—8 of Fig. 5.

Fig. 9 is a sectional view of a magazine, showing a portion of the tensioning mechanism, taken generally along the line 9—9 of Fig. 5;

Fig. 10 is a sectional view of a drawer, provided with a portable stick holding a carrying device having twelve rows of four openings per row;

Fig. 11 is a constructional detailed view;

Fig. 12 is a sectional view of a detail, showing the tension release mechanism, taken generally along line 12—12 of Fig. 2;

Fig. 13 is a view similar to that of Fig. 10, but with a carrying device having less stick openings;

Fig. 14 is a sectional, fragmentary view taken through the portion 42 and disclosing a V-shaped groove and a V-shaped portion of the cross-head adapted to ride in said groove.

Figure 1:
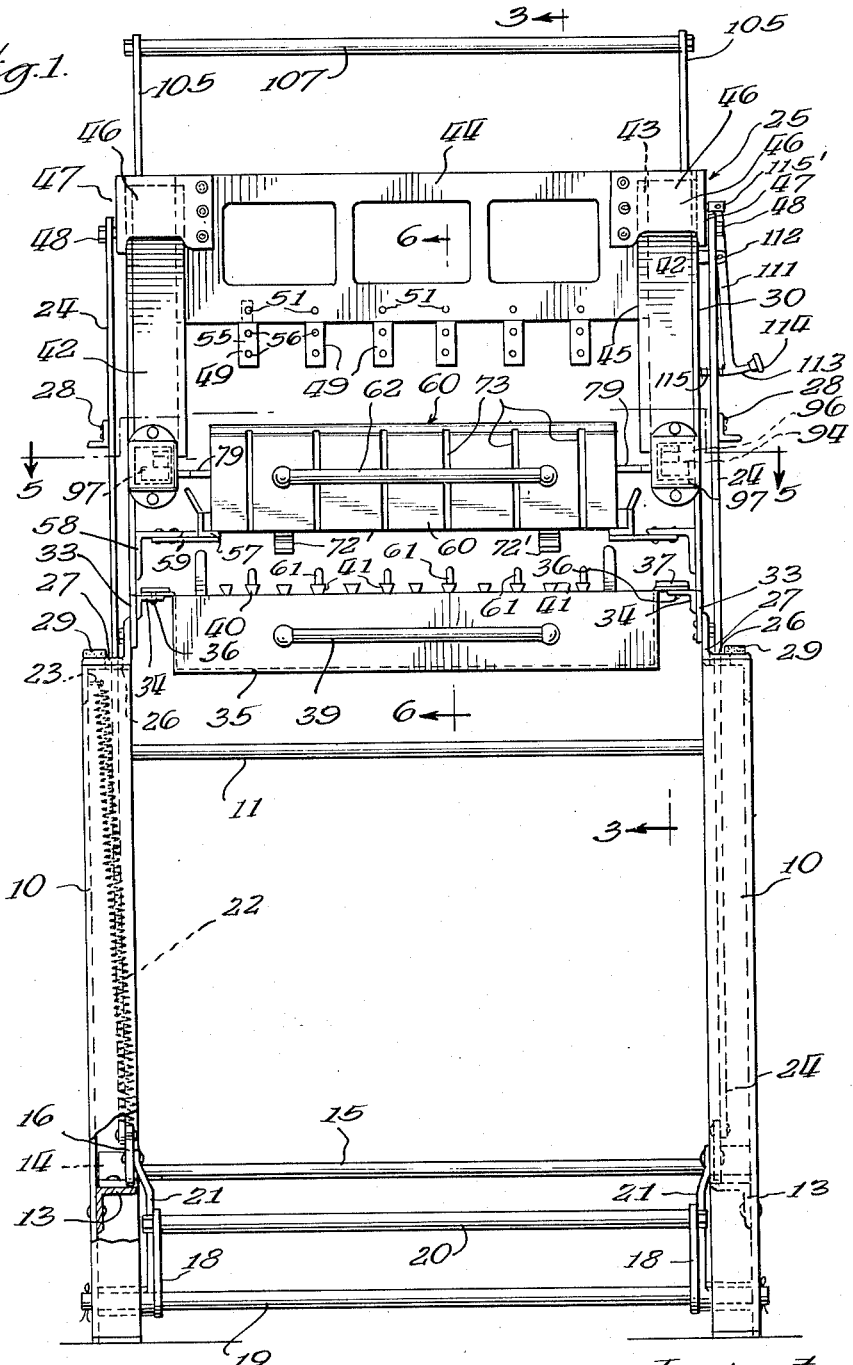
Fig. 1 is an elevational view of an embodiment of the present invention.

Generally, the present invention comprises a framework provided with a cross-head which is adapted for vertical movement. Said cross-head is operated by means of a treadle, which may be actuated by the operator. Said cross-head is provided with a plurality of fingers which select one stick from a plurality of magazines holding a plurality of said sticks, and projecting same into a portable stick carrying and holding device. Said magazines are contained in a drawer-like member, which is held upon said framework and may be easily removed therefrom to permit the magazines therein to be filled with said sticks. Said sticks are tensioned in said magazines by means of a cross-bar providing fingers engaging the rear of each row of sticks in each of said magazines, said bar being actuated forward by projections on a pair of racks. Said racks are actuated by gears which are further actuated by smaller racks, and said last-mentioned racks are moved by means of a manually operable bar. Said manually operable bar may be locked in a position where said sticks are not tensioned.

More specifically, the reference character 10 designates generally a framework constructed in the preferred embodiment of angle iron members welded or otherwise held together. There are two of said members 10, each of which is generally of inverted U-shape and same are held in assembly by means of cross-bars 11 bolted between said members, as shown by the nuts 12. A cross-piece 13 is provided on each of the members 10, and secured to said cross-piece 13 is a pillow block 14. Said pillow block provides bearing for a rod 15, upon which is disposed a link member 16 adapted to be operated by a treadle.

Said treadle 17 comprises generally a pair of long bar members 18 pivoted about a rod 19, which is fixed in the legs of the member 10. Opposite to the bar 19 a rod 20 is bolted between said members 18. A link 21 is provided between the members 16 and 18, whereby when said treadle 17 is depressed, the bar member 16 will be pivoted about the rod 15. The member 16 is urged in an upward direction by means of the coil spring 22, which is fixed to the frame 10, as shown at 23. Attached to the end of the member 16 is the actuating rod 24, which connects with the cross-head 25 of the device. Said cross-head is adapted for movement up and down by means of said treadle 17 and associated mechanism for a purpose to be described.

The member 24 passes through an opening 26 cut therefor in the top portion of the member 10. Disposed upon each member 10 is a channel member 27 which is also provided with an opening for the accommodation of the bar 24. Said opening registers with the opening 26. The bar member 24 is further provided with a stop 28 to limit the downward movement thereof. At the point where the stop member 28 reaches the angle member 27 in its downward motion, rubber bumpers 29 are provided to cushion said stop member 28.

A substantially L-shaped plate member 30 is attached to each of the angle members 27 by means of the bolts 31. Between said plate members 30 extend bars or rods 32, serving to maintain the device in assembly. The front portions of the angle members 27 are provided with bar members 33 to which are fixed angle members 34. Said angle members act as rails for the guidance of the drawer 35. Said drawer 35 is adapted to be positioned at various points along said rail 34 by reason of pin members 36 provided on the ears 37 of said drawer, entering gauge slots 38. By means of said pins 36 and gauge slots 38, said drawer may be positioned in any desired place below the cross-head 25, for a purpose to be presently described. Said drawer 35 is provided with a handle member 39 for the manipulation thereof and is adapted to contain a portable stick carrying and holding device 40.

Said stick holding device 40, one of which is clearly shown in Fig. 10 and one in Fig. 13, comprises a plurality of stick openings 41, into which sticks may be dropped, and means operated to fix the sticks within said stick openings. Said stick carrying device is one which is well-known to the trade, and it forms no part of the present invention. Means further referred thereto other than generally will not be made.

In the process of dropping sticks into said stick holding device, the sticks are allowed to drop as far as is gauged by the depth of the drawer 35. In operation, either a device, as shown in Fig. 10, comprising twelve rows of four openings each may be used, or a stick carrying device such as shown in Fig. 13 comprising six rows of four openings each may be used. The twelve row carrier is used for smaller confections and may be operated on the present device by first filling six rows, while the holder is in the position shown in Fig. 1, and then when said six rows are filled moving the holder within the drawer 35 to fill the alternate openings in one row. Said rows are filled by depressing the treadle 17 to cause the cross-head 25 to descend and deposit sticks in said stick carrying devices.

The mechanism of said cross-head is to be presently described. Fixed to the front portion of the plate members 30 on each side of the device are members 42, which provide tracks or grooves 43, in which the cross-head 25 is adapted to ride. Said cross-head comprises a framework 44, extending between the member 42 and provided with a V-shaped portion 45 adapted to ride in the grooves 43. Members 46 are rigidly attached to each side of the framework 44 at the top thereof and extend around the members 42 to provide portions 47 to which the members 24 are attached at 48.

The cross-head frame 44 is provided at the bottom edge thereof with a plurality of finger-like members 49. Each of said finger-like members 49 is provided with a cylindrical shank 50, which extends into a conformingly shaped opening in the cross-head frame 44 and is held therein by a set screw 51. The bottom portion of said finger 49 is provided with a slot 52, within which is pinned a dog 53. Said dog 53 is pivotally held by the pin member 54 and caused to assume normally the position shown in Fig. 6 by means of the resilient spring 55, which is held in place by the screws 56.

Thus, it will be seen that the dog 53 will not rotate about said pin member 54 in a counter-clockwise direction, but will readily rotate a small amount in a clockwise direction, and when rotated a small amount in clockwise direction and released, will return to the position shown in Fig. 6 by reason of the resilient spring 55.

A second track 57 is fixed to the plate member 30 by means of the angle members 58 and the plate members 59. Said track provides positioning for the drawer member 60, which contains the sticks 61. Said drawer 60 is provided with a handle 62 for manipulating same. The sticks 61 are positioned in a plurality of individual magazines 63, which extend between the front face 64 and the rear wall 65 of said drawer member 60.

Each of the magazines comprises upper and lower portions 66 and 67, respectively. Said upper and lower portions comprise sheet metal members extending the length of the drawer 60 and consisting of pairs of said members separated a sufficient distance to provide room for the disposition thereof of said sticks 61.

By the expedients shown in Fig. 8, the free ends 68 and 69 are bent around, as shown, to provide a space between said upper and lower portions 66 and 67. The faces of the drawer 60, the upper and lower portions 66 and 67 are provided with bent-around flanges, which are welded to said drawer as shown at 70. The upper portion 66 is provided at its upper edges with bent portions 71 to provide a groove 72, into which the stick members 61 may be easily placed.

At the front portion of the drawer 60, on the face 64 thereof at spaced intervals, where the magazines 63 abut, are provided a plurality of longitudinal slots 73 corresponding to the number of magazines. Each of said slots is of a size large enough to accommodate the width of the dog member 53 in its downward path when moved thus by the downward stroke of the cross-head. Said dog member extends out beyond the edge of the cross-head 25 such distance, that as it passes into the slot 73, it engages the first one of the row of sticks 61 in the magazine 63, projecting it downward past the drawer 60 and dropping it into the stick holder 40.

It will be noted that the drawer member 60 is provided at its front portion with a hinged member 74, which is pivoted about the pin 75 at the bottom of the drawer. Thus, as the stick is pushed downward, the hinged portion 74 is caused to rotate in a counter clockwise direction against the tension of a coil spring 76 positioned to normally keep the member in the position shown in Fig. 6. Note further, that the front portion of the drawer at the bottom thereof is provided adjacent to each of the slots 73 with an opening 77, through which the stick members 61 may individually be pushed by the dog 53.

It is the purpose of the member 74 to prevent sticks from dropping through said opening 77, while said magazines 63 of said drawer are being filled and said sticks 61 are not under tension.

For the purpose of tensioning said sticks, a bar member 78 is provided. Said bar member extends through the openings between said upper and lower portions 66 and 67 of said magazine 63 and has portions thereof extending outwardly through the drawer member 60, as shown at 79. The rear wall of the drawer 60 is provided with a clip 80 of resilient spring metal to hold the bar member 78 when sticks are being placed into the magazine 63. As shown in Fig. 9, the bar member is provided with a pivotally attached vertical member 80 extending into each magazine 63. Said members 80 have horizontal extensions 80' which are pivotally pinned to the bar 78 by the screw pins 80''. Said pivotally attached vertical members 80 are provided with upper and lower spring fingers 81, extending through openings 82 formed in said members 80. The forward ends of said fingers 81 are provided with flattened bearing portions 83 for bearing against the rows of sticks 61, and the rear of said fingers 81 are provided with washers 84 to limit movement of said fingers. Said fingers are normally urged to move forward or to the left, as shown in Fig. 9, by means of the coil springs 85, and serve to equalize pressure against said end of said row of sticks in a vertical plane.

The explanation above clearly shows the manner in which the rows of sticks 61 are tensioned within the respective magazines 63 by means of the plungers or fingers 85, which are acted upon by the bar 78 to urge the said rows of sticks forward in the drawer 60 to abut against the front face 64 thereof.

The drawer 60 is slidable upon the rails 57, as aforesaid, and is completely removable therefrom. The drawer is positioned in place by means of depending portions 86 which drop into openings or notches 87 provided in the rails 57. The said depending portions may take the form of pins, legs, ears or the like, or may be an extension of the front wall 64, as shown at 86'. The tensioning of the rows of sticks 61 in the magazine 63 tends to urge the drawer forward on the rails 57 so that the position of the drawer 60 and the slots 73 is correctly adjusted with respect to the dogs 53 when the depending portion 86 abuts against the forward edge of the notch 87.

The bar member 78 is moved forward to tension the rows of sticks 61 in the magazines 63 and also to correctly position the drawer-like magazine holder 60, as explained. Said forward motion is caused by the engagement of lugs 88 with portions 79 extending outward from the drawer 60 at the sides thereof, said portions 79 being parts of the bar member 78. As clearly shown in Fig. 5, the legs 88 can only engage the portions 79 while moving in a forward direction, thus allowing rearward motion of the bar 78 to be made manually. This also permits the withdrawal of the drawer 60 from the device without moving or disturbing any of the mechanism.

When said drawers 60 are thus removed from the device, they are more easily replenished with sticks than if the drawers remained in the device. The sticks are inserted into the magazine 63 in bundles by slipping same past the V-grooved portions 72. To facilitate the loading of the magazines, the drawer is held in a rack (not shown) by means of the hooked portions 72' to slant downward and forward. The openings 77 are blocked to prevent dropping out of sticks 61 in this position by the member 74 as set forth previously.

The lugs 88 are each fixed to a sliding bar member 89, which slides in a grooved bar member 90, which, in turn, is fixed to the side plate 30 by the screws 91. Said sliding bar member 89 is maintained in said grooved member 90 by means of a flat bar 92, which is fastened to the top thereof as shown in Fig. 4.

Fixedly attached to said sliding bar 89 by means of the screws 93 is a rack bar 94. The rack bar 94 is actuated by a spur gear 95 meshing therewith to cause said rack to slide back and forth in the grooved member 90 to tension the rows of sticks 61 in the magazines 63. The length of stroke of said rack bar 94 is such that at times it normally extends well beyond the front of the device, past the member 42. Consequently, said member 42 is provided with an opening 96 through which the rack member 94 may project.

On the outer side of the member 42 protecting enclosures 97 are attached to shield and conceal the protruding portions of the rack member 94.

The spur gears 95 which caused the racks 94 to move in the grooved members 90 are each rotatably attached to a stub shaft 98, which, in turn, is fixed to the plate member 30, by means of the nut 99. Rotating with each of the spur gears 95 and formed as a portion of its hub is a small pinion gear 100, which meshes with a sliding rack 101. The rack 101 is arranged to slide in the grooved bar member 102 in a manner similar to that by which the rack 94 slides in the member 90. The grooved member 102 is fixed to the plate member 30 by the screws 103. Each of the racks 101 is provided with a pivotally attached linkage member 104, which, in turn, is linked with the lever 105. Said levers 105 are pivoted at points 106 on the plates 30 and are provided at the ends thereof with a rod member 107, which extends between said levers and serves as a grasping member.

The lever members 105 and the grasping bar 107 are normally urged to rotate about the pivot points 106 by means of coil springs 108, which extend between the tie rod 32 and a pin 109 fixed in each of said levers 105. Stop members 110 are provided, as shown, to limit movement of said levers 105.

One of the plate members 30 is provided with a novel stop means for the tension of the levers 105. It operates as a detent to hold the right-hand lever 106 in a manner best shown in Fig. 12.

A lever 111 is pivoted about a bracket 112 which is attached, as shown, to the plate member 30. One end of the lever is provided with an arcuate portion 113 provided with a knob 114 and a coil spring 115, which normally urges the lever 111 to rotate in a clockwise direction, as viewed in Fig. 12. The end of said lever 111 opposite to the arcuate portion 113 is provided with a loosely attached member comprising a pin 114' and a stop 115'.

Said pin 114' is adapted to project through an opening in said plate 30 into the path of said right-handed lever 106. The end of said pin 114' in the path of said lever 105 while the same is moving in a forward direction, is beveled at 116, so that if a lever 105 is moved against said beveled portion 116, it will cause the lever 111 to move slightly in a counter clockwise direction, as viewed in Fig. 12, compressing the coil spring 115. When the lever 105 has passed the pin 114', the spring 115 causes the pin to return to a position where it is in the return path of the lever 105.

The portion of the pin 114 projecting into the path of the lever 105 when the said lever 105 is to the left of the pin member 114' as viewed in Fig. 2, is such that the coil spring 108 urges the lever 105 against the pin 114' at a place where the same is not beveled. Thus, the pin acts to prevent return of the tension in the lever.

To release the lever 105, the knob 114 may be pushed inward to withdraw the pin 114' from the path of the lever 106, allowing the same to return by reason of the tension of the coil spring 108.

The operation of the device will herewith be explained. For the purposes of this explanation, it will be assumed that the drawer 60 is in place with the magazines thereof filled with sticks 61, and that the tensioning device is operating to tension the sticks 61 in the magazines 63. Hence, the levers 105 and the grasping member 107 are being operated upon by the spring 108. The bar member 107 is as far to the right, as viewed in Fig. 3, as the spring 108 can pull it. A drawer member 35 is placed upon the rails 34 with the pins 36 dropped into the slots 38'. A portable stick carrying device 40, such as shown in Fig. 10 or Fig. 13 is placed within the drawer 35. The drawer 35 with the stick carrying device is moved on the rails 34 and the pin members 36 are dropped into the furthest slot 38 from the front. In this position, the first row of stick openings 41 is directly beneath the dog members 53 and the row of front openings 77 of the drawer 60.

In this position, the treadle 17 is depressed, drawing down the linkage 21 and causing the member 16 to rotate about the bar 15 against the tension of the spring 22, pulling down the actuating bar 24 to the length of its stroke, as measured by its stop 28 abutting against the rubber cushion 29.

In this downward stroke the cross-head 25 is moved by means of the portions 45 sliding within the tracks 43, carrying with it the fingers 49 positioned on the bottom thereof. The dogs 53 which are disposed on the bottom of said fingers 49 move into the slots 73, which are formed on the front face 64 of the drawer 60. Said dogs engage one stick in each of the magazines 63 and simultaneously cause each of said sticks to move through the opening 77, past the blocking member 74, out of the drawer 60 and down and into each opening 41 of the row of said openings which is positioned directly beneath said dogs 53. The treadle is then released and the spring 22 contracts, drawing up the cross-head 25 with its framework 44 to the original position. While said cross-head is passing, the front portion of the drawer 60, the dogs 53 are slightly rotated in a clockwise direction about the pins 54 and against the resilience of the spring 55 to ride past the next positioned sticks 61, which have now occupied the position of the former sticks within each of the magazines 63.

When each dog has passed the drawer 60 and the slot 73, the resilience of the spring 55 causes the dog to return to the position shown in Fig. 6. The spring 74 causes the blocking member 76 to return to the position shown in Fig. 6 after the stick positioned over the opening 77 has been completely expelled.

In dropping the stick into the opening 41, said stick extends into the drawer the limit as measured by the bottom of the drawer, as shown in Fig. 6.

The sticks are caused to move forward in the drawer 60 in the magazine 63 thereof by the tensioning means. Said tensioning means operates as follows:

The spring 108 pivots the lever 105, as shown in Fig. 3, about the point 106, causing the rack 101 to move to the left. This rotates the pinion 100 in a clockwise direction, and since the pinion 100 is attached to the spur gear 95, the spur gear 95 also rotates in a clockwise direction.

The spur gear meshes with a rack 94, which travels in a grooved member 90 and has attached to it a lug 88. Said lug is engaged with the extensions 79 of the bar 78, which extend out through the sides of the drawer 60. Said bar 78 is provided with vertical members 80, as explained above, and said vertical members 80 and fingers 81 which force the sticks 61 towards the front of the drawer 60 in the magazines thereof.

Hence, it will be seen that as a stick is removed from each of the magazines at the front thereof by the dogs 53 on the fingers 49, the tension of said rows of sticks will cause a new stick to move into the position of the one removed.

When the row of openings 41 in the stick carrying device 40 are filled, the drawer 35 is moved to the next position, as measured by the length of one of the slots 38. In this position, the next row of the openings in the stick carrying device is directly under the row of fingers of the cross-head, and the same procedure as described above may be followed to fill said row with sticks. When the entire device is filled with sticks in this manner, the device is operated to fix the sticks within the device and same is removed from the drawer 35 and replaced by another stick carrying device 40.

If a large stick carrying device, i. e., one having twelve rows is used with the device described having only six fingers and corresponding dogs 53, then when six of said openings 41 are filled, as shown in Fig. 1, the stick carrying device 40 may be moved to the right within the drawer 35 and the treadle depressed to fill the alternate openings 41 with sticks. Thus, in two motions, a complete row of twelve openings 41 may be filled with sticks.

When a stick holder having rows of six openings is used, it is arranged to be positioned directly under each of the slots 73, so that each motion of the treadle fills a complete row in one stroke.

As the drawers 35 and the stick holders 40 are filled with sticks and removed therefrom, the magazines 63 of the drawer 60 are gradually emptied of sticks until finally all of the sticks are gone and the drawer is ready to be replenished. The bar 107 is grasped and pulled forward or to the left, as viewed in Fig. 2. It contacts the beveled portion 116 of the pin 114' and forces said pin to the left, as viewed in Fig. 12 against the tension of the spring 115. The bar 105 is pulled past said pin 114' and then released.

In the meantime, the spring 115 has caused the lever 111 to move the pin 114' back in place as measured by the stop 115' into the return path of the levers 105. Thus, the spring 108 is extended and no pressure is being put upon the bar 78. The bar 78 in this position is manually moved to the rear of the drawer and the drawer filled with sticks, or else the drawer 60 may be moved out of the device completely along the tracks 57 by lifting same so that the member 86 comes out of the notch 87. When the drawer 60 is out of the device, it may be more conveniently filled.

Assuming now that the drawer 60 is filled with sticks 61, it is returned to the tracks 57 and moved so that the member 86 depends into the notch 87. Now the knob 114 is pressed inward, releasing the levers 105 and causing the lug 88 to engage the extension 79 of the bar 78. This tensions the rows of sticks 61 in the magazine 63 and moves the drawer a slight amount forward until the member 86 is against the forward end of the notch 87. In this position, the device is poised for further operation of the treadle to move the cross-head to expel sticks from the magazines of the drawer 60 into stick carrying devices.

It is seen that I have provided a novel and simply constructed device which is ideally adapted for the efficient handling of sticks for frozen confections. It will further be seen that the objects stated at the beginning of this specification have been fulfilled with great efficiency and the resulting device is clearly superior to any heretofore described in the prior art.

It is believed that my invention, its mode of construction and assembly, and many of its advantages should be readily understood from the foregoing without further description, and it should also be manifest that while a preferred embodiment of the invention has been shown and described for illustrative purposes, the structural details are nevertheless capable of wide variation within the purview of my invention as defined in the appended claims.

What I claim and desire to secure by Letters Patent of the United States is:

1. In a device of the character described, a supporting structure, means for supporting and positioning a stick receiving device on said structure, means for carrying a plurality of rows of sticks disposed on said structure, and means movable upon said structure for periodically selecting one stick from each of said rows within said carrying means and expelling same from said carrying means into said stick receiving device, said supporting and positioning means comprising a pair of tracks disposed upon said structure, a drawer-like member adapted to hold said stick receiving device, slots formed on said tracks, projections on said drawer-like member for engaging in said slots for positioning said drawer-carrying device in various positions with respect to said movable selecting means, said slots being disposed along said tracks substantially parallel to the direction in which said drawer-like member is moved to said positions with respect to said movable selecting means.

2. In a device of the character described, a supporting structure, means for supporting and positioning a stick receiving device on said structure, means for carrying a plurality of rows of sticks removably disposed on said structure, and means movable upon said structure for periodically selecting one stick from each of said rows within said carrying means and expelling same from said carrying means into said stick receiving device, said carrying means comprising a drawer slidably disposed upon said structure, a plurality of stick carrying magazines fixed within said drawer, a slot in one wall of said drawer at the end of each of said magazines, and tension means for normally urging said rows of sticks in said magazines against said slots, said movable selecting means being adapted to enter said slots and operate to expel one stick from each of said magazines through said slots, respectively.

3. In a device of the character described, a supporting structure, means for supporting and positioning a stick receiving device on said structure, means for carrying a plurality of rows of sticks removably disposed on said structure, and means movable upon said structure for periodically selecting one stick from each of said rows within said carrying means and expelling same from said carrying means into said stick receiving device, said carrying means comprising a drawer slidably disposed upon said structure, magazines within said drawer for accommodating said rows of sticks, openings in said drawer at the end of said magazines to permit the expulsion of sticks from said magazines by said movable selecting means, means normally blocking said openings for preventing said sticks from dropping out therethrough, said blocking means being moved to a non-blocking position by sticks in the process of being expelled when said selecting means is operated, and returning to said blocking position when said expulsion process is completed.

4. In a device of the character described, a supporting structure, means for supporting and positioning a stick receiving device on said structure, means for carrying a plurality of rows of sticks removably disposed on said structure, means movable upon said structure for periodically selecting one stick from each of said rows within said carrying means and expelling same from said carrying means into said stick receiving device, said carrying means comprising a drawer slidably disposed upon said structure, magazines within said drawer for accommodating said rows of sticks, openings in said drawer at the end of said magazines to permit the expulsion of sticks from said magazines by said movable selecting means, means normally blocking said openings for preventing said sticks from dropping out therethrough, said blocking means being moved to a non-blocking position by sticks in the process of being expelled when said selecting means is operated, and returning to said blocking position when said expulsion process is completed, and tensioning means associated with said drawer for constantly urging said rows of sticks in said magazines towards the ends which are provided with said openings.

5. In a device of the character described, a supporting structure, means for supporting and positioning a stick receiving device on said structure, means for carrying a plurality of rows of sticks removably disposed on said structure, and means movable upon said structure for periodically selecting one stick from each of said rows within said carrying means and expelling same from said carrying means into said stick receiving device, said carrying means comprising a drawer member provided with a plurality of magazines for holding said rows of sticks, openings in said drawer through which said sticks may be expelled and through which said selecting means may operate to cause said expulsion, each of said magazines including an upper and a lower portion, tensioning means for urging said sticks to an expellable position comprising a member in said drawer disposed for movement between said upper and lower portions of said magazines to exert force against the ends of said rows of sticks, and means causing the urging motion of said last-mentioned member.

6. In a device of the character described, a supporting structure, means for supporting and positioning a stick receiving device on said structure, means for carrying a plurality of rows of sticks removably disposed on said structure, and means movable upon said structure for periodically selecting one stick from each of said rows within said carrying means and expelling same from said carrying means into said stick receiving device, said carrying means comprising a drawer member provided with a plurality of magazines for holding said rows of sticks, openings in said drawer through which said sticks may be expelled and through which said selecting means may operate to cause said expulsion, each of said magazines including an upper and a lower portion, tensioning means for urging said sticks to an expellable position comprising a member in said drawer disposed for movement between said upper and lower portions of said magazines to exert force against the ends of said rows of sticks, means causing the urging motion of said last-mentioned member, said last-mentioned member being provided with resilient fingers extending therefrom and bearing against the end of the row of sticks in each magazine whereby differences in the amounts of sticks in all of said magazines may be compensated for.

7. In a device of the character described, a supporting structure, means for supporting and positioning a stick receiving device on said structure, means for carrying a plurality of rows of sticks removably disposed on said structure, and means movable upon said structure for periodically selecting one stick from each of said rows within said carrying means and expelling same from said carrying means into said stick receiving device, said carrying means comprising a drawer member provided with a plurality of magazines for holding said rows of sticks, openings in said drawer through which said sticks may be expelled and through which said selecting means may operate to cause said expulsion, each of said magazines including an upper and a lower portion, tensioning means for urging said sticks to an expellable position comprising a member in said drawer disposed for movement between said upper and lower portions of said magazines to exert force against the ends of said rows of sticks, and means causing the urging motion of said last-mentioned member, said last-mentioned member being provided with a pivotally attached member in each magazine having resilient fingers extending therefrom into said magazine and bearing against the end of the row of sticks in said magazine.

8. In a device of the character described, a supporting structure, means for supporting and positioning a stick receiving device on said structure, means for carrying a plurality of rows of sticks removably disposed on said structure, and means movable upon said structure for periodically selecting one stick from each of said rows within said carrying means and expelling same from said carrying means into said stick receiving device, said carrying means comprising a drawer member provided with a plurality of magazines for holding said rows of sticks, openings in said drawer through which said sticks may be expelled and through which said selecting means may operate to cause said expulsion, each of said magazines including an upper and a lower portion, tensioning means for urging said sticks to an expellable position comprising a member in said drawer disposed for movement between said upper and lower portions of said magazines to exert force against the ends of said rows of sticks, and means engaging the ends of said last-mentioned member being fixed to a rack, means for causing said rack to slide, and spring means associated with said rack sliding means normally causing said last-mentioned member to exert pressure on said rows of sticks within said magazines.

9. In a device of the character described, a supporting structure, means for supporting and positioning a stick receiving device on said structure, means for carrying a plurality of rows of sticks removably disposed on said structure, means movable upon said structure for periodically selecting one stick from each of said rows within said carrying means and expelling same from said carrying means into said stick receiving device, said carrying means comprising a drawer member provided with a plurality of magazines for holding said rows of sticks, openings in said drawer through which said sticks may be expelled and through which said selecting means may operate to cause said expulsion, each of said magazines including an upper and a lower portion, tensioning means for urging said sticks to an expellable position comprising a member in said drawer disposed for movement between said upper and lower portions of said magazines to exert force against the ends of said rows of sticks, means engaging the ends of said last-mentioned member being fixed to a rack, means for causing said rack to slide, spring means associated with said rack sliding means normally causing said last-mentioned member to exert pressure on said rows of sticks within said magazines, and means for manually moving said rack sliding means against the tension of its said associated spring means to relieve the pressure against said rows of sticks in said magazine.

10. In a device of the character described, a supporting structure, means for supporting and positioning a stick receiving device on said structure, means for carrying a plurality of rows of sticks removably disposed on said structure, means movable upon said structure for periodically selecting one stick from each of said rows within said carrying means and expelling same from said carrying means into said stick receiving device, said carrying means comprising a drawer provided with a plurality of magazines for holding said rows of sticks, openings in said drawer through which said sticks may be expelled and through which said selecting means may operate to cause said expulsion, each of said magazines including an upper and a lower portion, tensioning means for urging said sticks to an expellable position comprising a member in said drawer disposed for movement between said upper and lower portions of said magazines to exert force against the ends of said rows of sticks, means engaging the ends of said last-mentioned member being fixed to a rack, means for causing said rack to slide, spring means associated with said rack sliding means normally causing said last-mentioned member to exert pressure on said rows of sticks within said magazines, means for manually moving said rack sliding means against the tension of its said associated spring means to relieve the pressure against said rows of sticks in said magazine, and means for locking said rack sliding means in a position where said rows of sticks are not under pressure.

11. In a device of the character described, including a supporting structure, a plurality of magazines adapted to hold rows of sticks, a drawer disposed on said structure in which said magazines are disposed, means for expelling one of said sticks from each of said rows out from said drawer, means for tensioning said rows of sticks within said magazines, said means consisting of a bar member projecting through each of said magazines and having end portions thereof projecting out through the sides of said drawer and adapted to slide along said magazines and apply force against the ends of said rows of sticks positioned in said magazines, rack means mounted on said supporting structure and engaging the said end portions of said bar member, gears associated with said rack means to cause said racks to slide when rotated and apply force upon said bar member, and means for actuating said gears.

12. In a device of the character described, including a supporting structure, a plurality of magazines adapted to hold rows of sticks, a drawer disposed on said structure in which said magazines are disposed, means for expelling one of said sticks from each of said rows out from said drawer, means for tensioning said rows of sticks within said magazines, said means consisting of a bar member projecting through each of said magazines and having end portions thereof projecting out through the sides of said drawer and adapted to slide along said magazines and apply force against the ends of said rows of sticks positioned in said magazines, rack means mounted on said supporting structure and engaging the said end portions of said bar member, gears associated with said rack means to cause said racks to slide when rotated and apply force upon said bar member, means for actuating said gears, said last-mentioned means including pinions associated with said gears, a second rack member meshing with each of said pinions, and a manually operable lever linked with said second racks for causing rotation of said pinions.

13. In a device of the character described, including a supporting structure, a plurality of magazines adapted to hold rows of sticks, a drawer disposed on said structure in which said magazines are disposed, means for expelling one of said sticks from each of said rows out from said drawer, means for tensioning said rows of sticks within said magazines, said means consisting of a bar member projecting through each of said magazines and having end portions thereof projecting out through the sides of said drawer and adapted to slide along said magazines and apply force against the ends of said rows of sticks positioned in said magazines, rack means mounted on said supporting structure and engaging the said end portions of said bar member, gears associated with said rack means to cause said racks to slide when rotated and apply force upon said bar member, means for actuating said gears, said last-mentioned means including pinions associated with said gears, a second rack member meshing with each of said pinions, a manually operable lever linked with said second racks for causing rotation of said pinions, said lever being pivoted on said structure, and spring means urging said lever in a direction in which said gears and racks will cooperate to move to tension said rows of sticks.

14. In a device of the character described, including a supporting structure, a plurality of magazines adapted to hold rows of sticks, a drawer disposed on said structure in which said magazines are disposed, means for expelling one of said sticks from each of said rows out from said drawer, means for tensioning said rows of sticks within said magazines, said means consisting of a bar member projecting through each of said magazines and having end portions thereof projecting out through the sides of said drawer and adapted to slide along said magazines and apply force against the ends of said rows of sticks positioned in said magazines, rack means mounted on said supporting structure and engaging the said end portions of said bar member, gears associated with said rack means to cause said racks to slide when rotated and apply force upon said bar member, means for actuating said gears, said last-mentioned means including pinions associated with said gears, a second rack member meshing with each of said pinions, a manually operable lever linked with said second racks for causing rotation of said pinions, said lever being pivoted on said structure, spring means urging said lever in a direction in which said gears and racks will cooperate to move to tension said rows of sticks, said lever being manually movable against said last-mentioned spring means to release the tension of said rows of sticks and catch means for holding said levers in said last-referred to position.

15. In a device of the character described, means for tensioning rows of sticks within a plurality of stick carrying magazines, including a spring urged lever and means to stop said lever, said stopping means consisting of a pivoted lever having a pin member projecting into the path of said first-mentioned lever on one end thereof, and a spring actuated extension on the other end for constantly urging said pin into the path of said first-mentioned lever.

16. In a device of the character described, means for tensioning rows of sticks within a plurality of stick carrying magazines, including a spring urged lever and means to stop said lever, said stopping means consisting of a pivoted lever having a pin member projecting into the path of said first-mentioned lever, said pin having a beveled portion whereby the first-mentioned lever may pass said pin when bearing against it in one direction and moving against the beveled portion to cause the second-mentioned lever to rock against the force of said spring actuated extension and said first-mentioned lever, being stopped by said pin when moving against it in the direction opposite to said beveled portion.

17. In a device of the character described, means for tensioning rows of sticks within a plurality of stick carrying magazines, including a spring urged lever and means to stop said lever, said stopping means consisting of a pivoted lever having a pin member projecting into the path of said first-mentioned lever on one end thereof, and a spring actuated extension on the other end for constantly urging said pin into the path of said first-mentioned lever, said pin having a beveled portion whereby the first-mentioned lever may pass said pin when bearing against it in one direction and moving against the beveled portion to cause the second-mentioned lever to rock against the force of said spring actuated extension and said first-mentioned lever, being stopped by said pin when moving against it in the direction opposite to said beveled portion, said spring actuated extension being provided with a knob whereby said pin may be removed from the path of said first-mentioned lever by depressing said knob and actuating said rocking lever.

18. A drawer for a stick handling device of the character described, adapted to periodically dispense a plurality of sticks simultaneously from magazines holding rows of said sticks, said drawer comprising a plurality of channel-like magazines extending between the front and rear walls of said drawer, said channels consisting of upper and lower portions spaced one from the other and adapted to hold rows of sticks, slots and openings in the front wall of said drawer by means of which said sticks may be expelled therefrom, and a bar member disposed in said drawer transversely thereof, extending through each of said magazines between the upper and lower portions thereof, slots in the side walls of said drawer extending lengthwise thereof for accommodating the ends of said bar member, said bar member being adapted to be urged toward the front of said drawer to apply force against the rear of rows of sticks in said magazines to tension said rows, whereby the first stick of each row will be constantly in an expellable position with respect to one of said slots and openings.

19. A drawer for a stick handling device of the character described, adapted to periodically dispense a plurality of sticks simultaneously from magazines holding rows of said sticks, said drawer comprising a plurality of channel-like magazines extending between the front and rear walls of said drawer, said channels consisting of upper and lower portions spaced one from the other and adapted to hold rows of sticks, slots and openings in the front wall of said drawer by means of which said sticks may be expelled therefrom, and a bar member disposed in said drawer transversely thereof, extending through each of said magazines between the upper and lower portions thereof, slots in the side walls of said drawer extending lengthwise thereof for accommodating the ends of said bar member, said bar member being adapted to be urged toward the front of said drawer to apply force against the rear of rows of sticks in said magazines to tension said rows, whereby the first stick of each row will be constantly in an expellable position with respect to one of said slots and openings, each of said openings being provided with blocking means spring biased to normally block said opening and prevent the dropping out of sticks thereto when said rows are not tensioned.

20. In a device of the character described, including a support, stick expelling means operable upon said support, a drawer upon said support provided with magazines adapted to hold rows of sticks, said stick expelling means operating to expel a stick from each of said rows in said magazines simultaneously, means for positioning said magazines with respect to said expelling means comprising rails upon which said drawer is disposed, notches in said rails, extensions on said drawer adapted to engage said notches, said notches being so positioned that when said extensions bear against one end thereof, said magazines in said drawer are correctly positioned with respect to said selecting means, and means for forcing said drawer in a direction to cause the extensions of said drawer to bear against said ends of said notches.

21. A stick magazine comprising upper and lower channel portions spaced one from the other, said channel portions being adapted to support a row of sticks, a slotted portion at one end of said magazine through which expelling means may be moved to expel a stick from said row, an opening in said magazine at the bottom of said slotted portion through which said stick may be expelled, and a member movable along said magazine between said upper and lower portions to cause said row of sticks to tightly bear against said slotted portion.

22. A stick magazine comprising upper and lower channel portions spaced one from the other, said channel portions being adapted to support a row of sticks, a slotted portion at one end of said magazine through which expelling means may be moved to expel a stick from said row, an opening in said magazine at the bottom of said slotted portion through which said stick may be expelled, and a member movable along said magazine between said upper and lower portions to cause said row of sticks to tightly bear against said slotted portion, said opening being provided with spring biased blocking means adapted to yield to a stick being expelled by said expelling means.

23. A stick magazine comprising upper and lower channel portions spaced one from the other, said channel portions being adapted to support a row of sticks, a slotted portion at one end of said magazine through which expelling means may be moved to expel a stick from said row, an opening in said magazine at the bottom of said slotted portion through which said stick may be expelled, and a member movable along said magazine between said upper and lower portions to cause said row of sticks to tightly bear against said slotted portion, said opening being provided with spring biased blocking means adapted to yield to a stick being expelled by said expelling means, and said member being provided with resilient fingers bearing against said row of sticks at the top and bottom thereof to equalize tension in said row of sticks in the vertical plane thereof.

24. A stick magazine comprising upper and lower channel portions spaced one from the other, said channel portions being adapted to support a row of sticks, a slotted portion at one end of said magazine through which expelling means may be moved to expel a stick from said row, an opening in said magazine at the bottom of said slotted portion through which said stick may be expelled, and a member movable along said magazine between said upper and lower portions to cause said row of sticks to tightly bear against said slotted portion, said member being provided with bearing means adapted to apply force against the end of said row of sticks.

SAMUEL GOODMAN.